United States Patent
Venkataraman Ganesh

(10) Patent No.: US 11,481,679 B2
(45) Date of Patent: Oct. 25, 2022

(54) ADAPTIVE DATA INGESTION RATES

(71) Applicant: KYNDRYL, INC., New York, NY (US)

(72) Inventor: Tinniam Venkataraman Ganesh, Bangalore (IN)

(73) Assignee: KYNDRYL, INC., New York, NY (US)

( * ) Notice: Subject to any disclaimer, the term of this patent is extended or adjusted under 35 U.S.C. 154(b) by 366 days.

(21) Appl. No.: 16/805,919

(22) Filed: Mar. 2, 2020

(65) Prior Publication Data

US 2021/0272015 A1 Sep. 2, 2021

(51) Int. Cl.
*G06N 20/00* (2019.01)
*G06F 8/60* (2018.01)
*H04L 69/08* (2022.01)

(52) U.S. Cl.
CPC ........... *G06N 20/00* (2019.01); *G06F 8/60* (2013.01); *H04L 69/08* (2013.01)

(58) Field of Classification Search
CPC  G06N 20/00; G06F 8/60; H04L 69/08; H04L 67/02; H04L 67/1097; H04N 21/262
See application file for complete search history.

(56) References Cited

U.S. PATENT DOCUMENTS

| | | | | |
|---|---|---|---|---|
| 5,738,104 A | * | 4/1998 | Lo | A61B 5/7203 600/509 |
| 6,937,770 B1 | * | 8/2005 | Oguz | H04N 19/132 375/E7.176 |
| 7,006,437 B2 | * | 2/2006 | Ogier | H04L 47/17 370/230.1 |
| 9,413,394 B1 | * | 8/2016 | Lye | H04B 1/0014 |
| 10,095,547 B1 | | 10/2018 | Kulkarni et al. | |
| 10,298,680 B1 | | 5/2019 | Thomas et al. | |
| 2003/0078065 A1 | * | 4/2003 | Hoagland | H04L 1/20 455/517 |
| 2004/0071132 A1 | * | 4/2004 | Sundqvist | G10L 19/24 704/E19.044 |
| 2004/0145502 A1 | * | 7/2004 | Thomson | H03H 17/0664 708/313 |
| 2005/0119996 A1 | * | 6/2005 | Ohata | G06F 11/3495 |
| 2006/0126713 A1 | * | 6/2006 | Chou | H04N 21/23406 375/225 |

(Continued)

OTHER PUBLICATIONS

Chowdhury et al., "Managing Data Transfers in Computer Clusters with Orchestra", SIGCOMM'11, Aug. 15-19, 2011, 12 pages.

(Continued)

*Primary Examiner* — Michael Won
(74) *Attorney, Agent, or Firm* — Zilka-Kotab, P.C.

(57) ABSTRACT

Described are techniques for data ingestion including determining a respective moving average streaming rate for each of a plurality of incoming data streams to a cluster-computing framework. The techniques further include determining a respective ingestion frequency for each of the plurality of incoming data streams by dividing a platform-preferred ingestion rate of the cluster-computing framework by a respective moving average streaming rate of each of the plurality of incoming data streams. The techniques further include ingesting each of the plurality of incoming data streams to the cluster-computing framework at the respective ingestion frequency.

20 Claims, 6 Drawing Sheets

(56) References Cited

U.S. PATENT DOCUMENTS

| | | | |
|---|---|---|---|
| 2011/0082656 A1* | 4/2011 | Todorokihara | G01R 23/10 324/76.19 |
| 2011/0270721 A1* | 11/2011 | Kusterer | G06Q 30/0641 709/224 |
| 2014/0126372 A1* | 5/2014 | Ito | H04L 47/40 370/235 |
| 2014/0180980 A1* | 6/2014 | Hido | G06Q 10/10 706/12 |
| 2015/0117685 A1* | 4/2015 | Reiss | H03G 3/32 381/300 |
| 2017/0195151 A1* | 7/2017 | Chu | H04L 27/22 |
| 2018/0109468 A1* | 4/2018 | Sridhar | H04L 5/006 |
| 2019/0079695 A1* | 3/2019 | Ekbote | G06F 3/0656 |
| 2019/0199604 A1* | 6/2019 | Barsumian | H04L 43/04 |
| 2020/0034764 A1* | 1/2020 | Panuganty | G06Q 10/0637 |
| 2020/0050694 A1* | 2/2020 | Avalani | G06F 16/2455 |
| 2020/0065441 A1* | 2/2020 | Park | G06F 17/13 |
| 2020/0241485 A1* | 7/2020 | Maeda | G06N 3/006 |
| 2021/0272015 A1* | 9/2021 | Venkataraman Ganesh | G06F 8/60 |

OTHER PUBLICATIONS

Mell et al., "The NIST Definition of Cloud Computing", Recommendations of the National Institute of Standards and Technology, Sep. 2011, 7 pages.

\* cited by examiner

ADAPTIVE DATA INGESTION RATES

BACKGROUND

The present disclosure relates to big data processing, and, more specifically, to managing adaptive data ingestion rates into data repositories.

One type of data repository is a data lake. A data lake can refer to a repository of data from a plurality of sources and/or in a plurality of formats. The data stored in the data lake can include raw data (e.g., a single datastore of all enterprise data) and/or corresponding transformed data, where the transformed data can have a standardized format that facilitates analysis of the transformed data.

SUMMARY

Aspects of the present disclosure are directed toward a computer-implemented method comprising determining a respective moving average streaming rate for each of a plurality of incoming data streams to a cluster-computing framework. The method further comprises determining a respective ingestion frequency for each of the plurality of incoming data streams by dividing a platform-preferred ingestion rate of the cluster-computing framework by a respective moving average streaming rate of each of the plurality of incoming data streams. The method further comprises ingesting each of the plurality of incoming data streams to the cluster-computing framework at the respective ingestion frequency.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
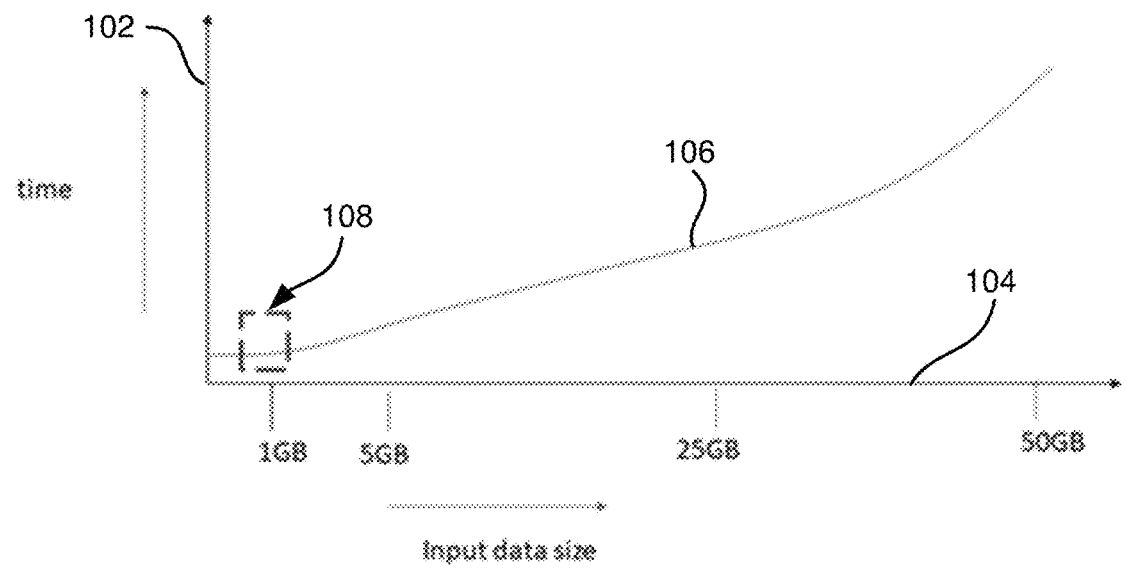
FIG. 1A illustrates a graph of processing time versus input data size for a given cluster-computing framework, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward big data processing, and, more specifically, to managing adaptive data ingestion rates into data repositories. While not limited to such applications, embodiments of the present disclosure may be better understood in light of the aforementioned context.

A data repository such as a data lake can be conceptualized as three layers of functionality: a data acquisition layer, a data processing layer, and a data consumption layer. The data acquisition layer is used to efficiently aggregate data in the data lake. The data processing layer can be used to transform aggregated data into a usable format (e.g., a predefined or standardized format). The data consumption layer can be used to analyze, evaluate, train, or otherwise process the aggregated and transformed data using big data processing techniques such as machine learning, deep learning, neural networks, artificial intelligence, machine vision, natural language processing, and/or other big data processing techniques.

Aspects of the present disclosure are directed toward improvements in the data acquisition layer, and, more specifically, to using adaptive data ingestion rates to efficiently batch process data in the data lake. Improving the efficiency of the data aggregation can improve the efficiency of the computational resources associated with the data lake. For example, the data lake can be characterized as a cluster-computing framework having a plurality of compute nodes, and aspects of the present disclosure can consume fewer processing resources, memory resources, and/or network resources of the compute nodes by efficiently batch processing the data using the adaptive data ingestion rates.

More specifically, aspects of the present disclosure are directed toward adaptively adjusting the ingestion frequency of a plurality of data sources to a data lake. The ingestion frequency can vary as a function of (1) a platform-preferred ingestion rate and (2) the respective data flow rates of each of the plurality of data sources.

Regarding the platform-preferred ingestion rate, various cluster-computing frameworks can be associated with preferred processing parameters for data ingestion. As one example, Apache Spark® exhibits suboptimal performance for smaller data input sizes (e.g., less than 1 GB). Thus, various cluster-computing frameworks can be associated with a platform-preferred data ingestion rate that results in the efficient transformation of raw data to a predetermined structure or format. Advantageously, aspects of the present disclosure are configured to account for the platform-preferred data ingestion rate based on a number of worker nodes associated with a cluster-computing framework, a number of processing cores associated with the cluster-computing framework, an amount of read-access memory (RAM) associated with the cluster-computing framework, and/or other parameters.

Regarding the respective data flow rates, some data flow rates are in the tens of megabytes (MB) per time interval range whereas other data flow rates are in the gigabytes (GB) per time interval range. Furthermore, each data flow rate can vary as a function of time. For example, one data flow rate can vary between 100 MB per hour to one GB per hour over a single day. Advantageously, aspects of the present disclosure are configured to account for data flow rate variability between different data streams and further account for data flow rate variability within each data stream by using a moving average data flow rate (e.g., a simple moving average, a cumulative moving average, a weighted moving average, an exponentially weighted moving average, etc.).

In other words, aspects of the present disclosure can determine the frequencies $f_1, f_2, \ldots f_N$, for ingesting from each of a plurality of incoming data sources of $s_1, s_2, \ldots s_N$, in order to realize efficient usage of the data lake computing resources. As previously discussed, the moving average data flow rate accounts for data flow rate variability and/or volatility (e.g., between different data streams and within each data stream) while the platform-preferred processing window accounts for the configuration of the cluster-computing framework (e.g., number of nodes, number of cores, amount of memory, and distributed computing platform). Individually and collectively, these aspects of the present disclosure can improve the efficiency of a data acquisition layer in any cluster-computing framework configured for data lake functionality.

Referring now to the figures, FIG. 1 is a graph 100 illustrating the processing time for various input data sizes in a given cluster-computing configuration of N data nodes (e.g., each with K cores and M GB of RAM). For the given cluster-computing configuration, the graph 100 includes a y-axis 102 of time (e.g., processing time) and an x-axis 104 of input data size (e.g., batch size). The time-size profile 106 for the given cluster-computing configuration illustrates the non-linear behavior of processing time as a function of input data size for the given cluster-computing configuration. For example, processing time is approximately unchanged for all data sizes below 1 GB. Thus, input data sizes less than 1 GB are processed inefficiently insofar as an input data size up to approximately 1 GB results in essentially the same processing time.

Preferred processing window 108 illustrates a preferred input data size and corresponding processing time for an application of the given cluster-computing configuration. The preferred processing window 108 can represent a platform-preferred ingestion rate based on, for example, a number of nodes, a number of cores, an amount of RAM, and/or a type of distributed computing platform. The preferred processing window 108 can comprise a number (e.g., 1 GB), a number with a tolerance (e.g., 1 GB±10%), or a range of numbers (e.g., 800 MB to 1.2 GB). Although FIG. 1A illustrates the preferred processing window 108 at approximate 1 GB, the preferred processing window 108 can be located elsewhere along the time-size profile 106 according to different applications of different cluster-computing configurations.

Figure 1B:
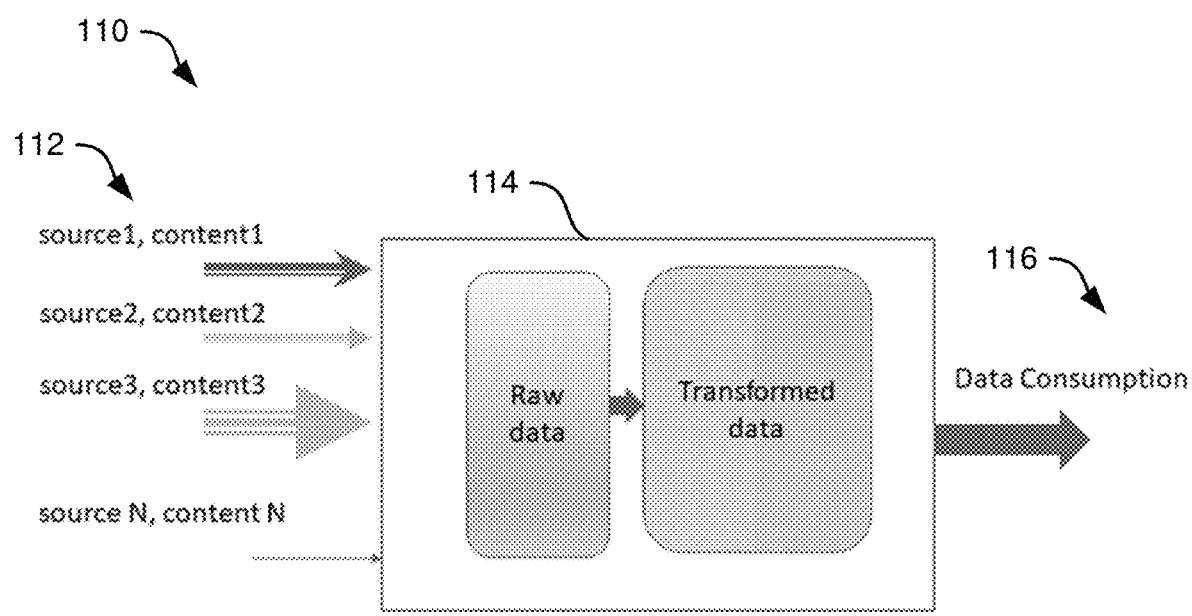
FIG. 1B illustrates a diagram of a plurality of data streams being aggregated and transformed by a cluster-computing framework, in accordance with some embodiments of the present disclosure.

FIG. 1B illustrates a data processing environment 110 of a plurality of input data streams 112 being ingested by a cluster-computing framework 114 that is configured to accumulate raw data from the plurality of input data streams 112 and convert the accumulated raw data into transformed data. The cluster-computing framework 114 outputs transformed data for consumption 116, where the transformed data for consumption 116 can be consumed for purposes of analysis, visualization, further modification, archiving, training, or another data consumption purpose. The cluster-computing framework 114 can include a plurality of nodes for distributed processing of the plurality of data streams 112 using various distributed data processing platforms such as, for example, Apache Spark®.

Although the plurality of data streams 112 include four data streams, any number of data streams are possible from one to hundreds or thousands. Furthermore, although four content types are shown, any number of content types are possible and can include structured, semi-structured, unstructured, and/or binary data. Furthermore, the varying sizes of the arrows in the plurality of data streams 112 can be indicative of varying data flow rates. As an example, source_1 can have a data flow rate of 200 MB/hour, source_2 can have a data flow rate of 50 MB/hour, source_3 can have a data flow rate of 1 GB/hour, and source_N can have a data flow rate of 8 MB/hour. As previously discussed, these different data flow rates can also vary over time. For example, the data flow rate of source_1 may vary between 120 MB/hour to 300 MB/hour over the course of a single day.

In light of FIGS. 1A and 1B, aspects of the present disclosure are configured to (1) accurately approximate the data flow rate of each of the plurality of data streams 112 using respective moving average data flow rates; (2) determine a respective efficient ingestion frequency for each of the plurality of data streams 112 based on the preferred processing window 108 of FIG. 1A and the respective moving average data flow rates; and (3) ingest each of the plurality of data streams 112 at the respective efficient ingestion frequency. These aspects of the present disclosure will be discussed in further detail hereinafter.

Figure 2:
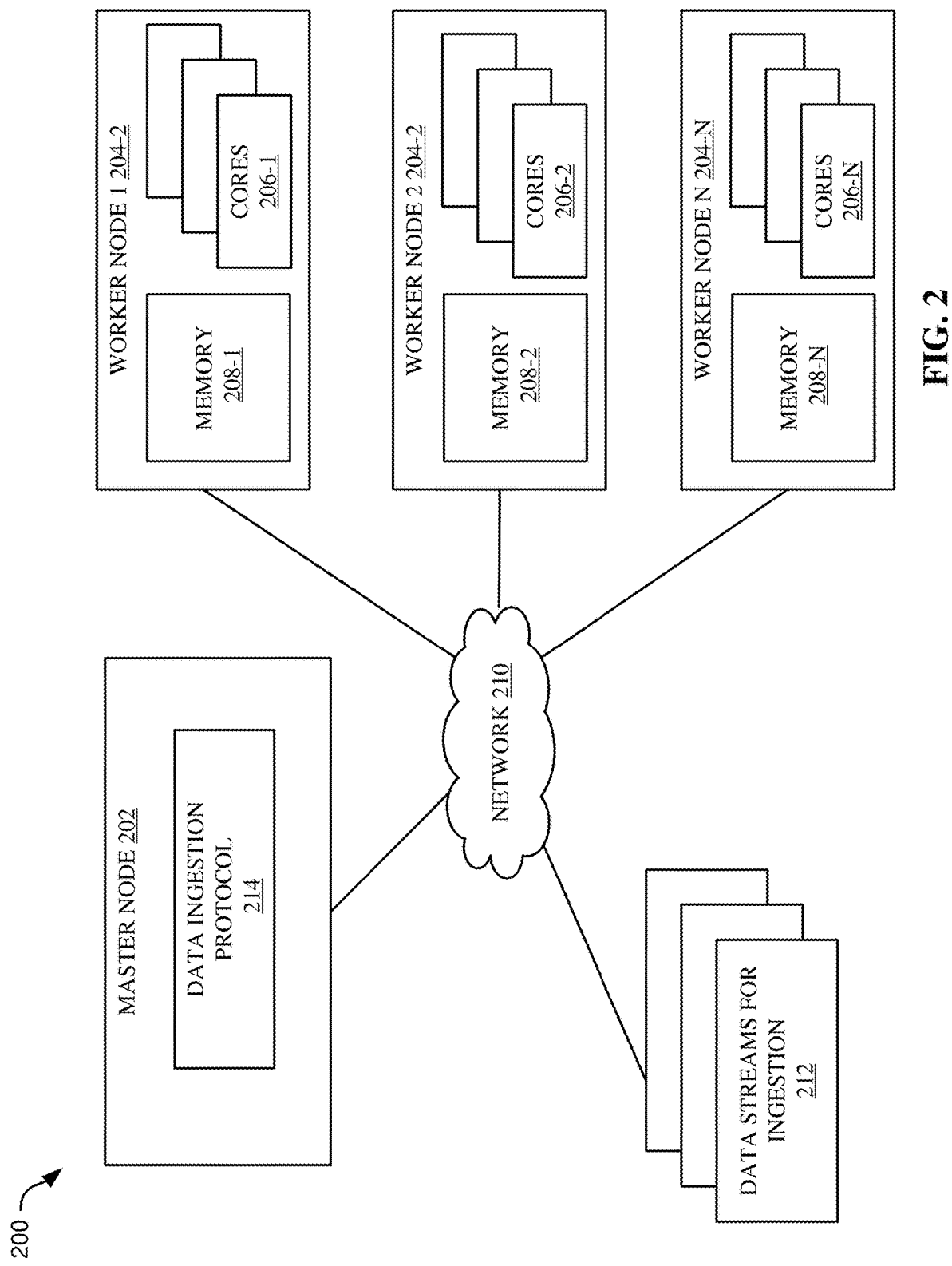
FIG. 2 illustrates block diagram of an example cluster-computing framework for ingesting a plurality of data streams, in accordance with some embodiments of the present disclosure.

FIG. 2 illustrates a block diagram of an example cluster-computing framework 200, in accordance with some embodiments of the present disclosure. The cluster-computing framework 200 can be configured to implement a distributed computing platform for data processing such as, for example, Apache Spark® which is a unified analytics engine for large-scale data processing. However, any number of other distributed computing platforms for data processing such as, but not limited to, Apache Fink®, Apache Storm, Apache Kafka® Streams, Apache Hadoop®, Apache Hive, Splunk®, Amazon Kinesis®, SQLstream®, Elastisearch, Statistical Analysis System (SAS®), The Information Bus Company (TIBCO) StreamBase®, International Business Machines Corporation (IBM) InfoSphere® Streams, and others. In other words, the adaptive data ingestion rates of the present disclosure can be incorporated into any number of distributed computing platforms for data processing for improving data processing efficiency of the distributed computing platforms.

The cluster-computing framework 200 can include a master node 202 communicatively coupled to a plurality of worker nodes 204 (individually shown as worker node 1 204-2, worker node 2 204-2, and worker node N 204-N, where N can be any variable number). Each worker node 204 can comprise one or more processing cores 206 (individually shown as processing cores 206-1, 206-2, and 206-N and generally indicative of processing capability provided by processors, microprocessors, and the like for manipulating, transforming, and/or creating data) and memories 208 (individually shown as memories 208-1, 208-2, and 208-N and generally representative of various types of short-term and/or long-term memory for temporarily or permanently storing manipulated, transformed, and/or created data).

Data streams for ingestion 212 can refer to any number of inbound data streams, each with a respective data flow rate such as the plurality of data streams 112 discussed in FIG. 1B. Data streams for ingestion 212 can refer to structured data (e.g., rows and columns retrieved from a relational database), semi-structured data (e.g., Comma-Separated Value (CSV) files, log files, eXtensible Markup Language (XML) files, JavaScript® Object Notation (JSON) files, etc.), unstructured data (e.g., emails, messages, documents, social networking streams, etc.), binary data (e.g., image data, audio data, video data, etc.), and/or other data.

The master node 202, worker nodes 204, and data streams for ingestion 212 can be communicatively coupled to one another by one or more networks, such as network 210. Network 210 can be representative of one or more similar or different networks that permanently or intermittently communicatively couple various aspects of the cluster-computing framework 200 to one another.

Master node 202 can be configured to organize the batch processing of data streams for ingestion 212 by the worker nodes 204. Master node 202 includes data ingestion protocol 214 for efficiently batching the data streams for ingestion 212. Data ingestion protocol 214 can be configured to determine an efficient ingestion frequency for each respective data stream for ingestion 212 based on characteristics of each respective data stream for ingestion 212 and on characteristics of the worker nodes 204 (e.g., a number of work nodes 204, a number of cores 206 per worker node 204, and/or an amount of memory 208 (e.g., GBs of RAM) per worker node 204). In other words, the data ingestion protocol 214 can be configured to (1) accurately approximate the data flow rate of each of the data streams for ingestion 212 by determining a moving average data flow rate for each respective data stream for ingestion 212; (2) determine a respective efficient ingestion frequency for each of the data streams for ingestion 212 based on a preferred processing window associated with the cluster-computing framework 200 and the respective moving average data flow rates; and (3) ingest each of the data streams for ingestion 212 at the respective efficient ingestion frequency.

Figure 3:
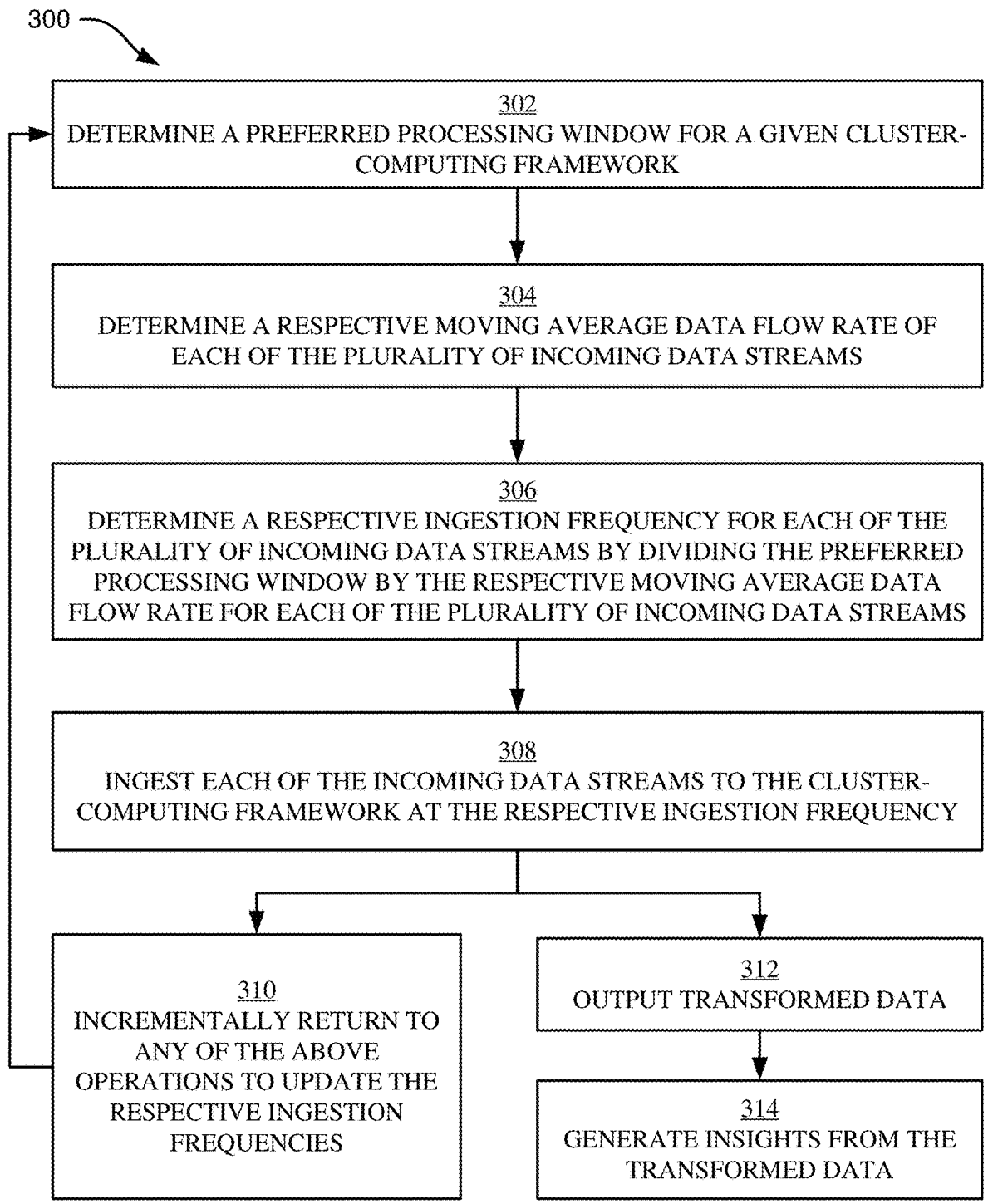
FIG. 3 illustrates a flowchart of an example method for efficiently ingesting a plurality of data streams to a cluster-computing framework, in accordance with some embodiments of the present disclosure.

FIG. 3 illustrates a flowchart of an example method 300 for efficiently ingesting a plurality of data streams to a cluster-computing framework, in accordance with some embodiments of the present disclosure. The method 300 can be implemented by a cluster-computing framework (e.g., cluster-computing framework 114 of FIG. 1B or cluster-computing framework 200 of FIG. 2), a master node (e.g., master node 202 of FIG. 2), a computer (e.g., computer 400 of FIG. 4), a cloud computing node (e.g., cloud computing node 10 of FIG. 5), a processor, or another configuration of hardware and/or software.

Operation 302 includes determining a preferred processing window for a given cluster-computing framework. In some embodiments, the preferred processing window is consistent with preferred processing window 108 of FIG. 1A. In some embodiments, the preferred processing window is based on characteristics of the given cluster-computing framework such as, for example, a number of nodes, a number of cores per node, and/or an amount of memory (e.g., RAM) per node, among other possible characteristics. The preferred processing window can be determined experimentally by, for example, inputting a variety batch sizes into a cluster-computing framework and monitoring the processing time associated with each of the variety of batch sizes. In some embodiments, the preferred processing window is characterized by a ratio of a batch size divided by a processing time associated with ingesting the batch size, where the ratio is above a threshold.

Operation 304 includes determining a respective moving average data flow rate of each of a plurality of incoming data streams. In some embodiments, the moving average data flow rate can be an exponentially weighted moving average (EWMA) (also referred to as an exponential moving average (EMA)). An EWMA can be a first-order infinite impulse response that applies weighting factors that decrease exponentially. In other words, the weight factor for each sequentially older data point decreases exponentially relative to a sequentially newer data point, but the weight factor never reaches zero regardless of how many data points are considered.

In some embodiments, the moving average can be calculated according to Equation 1:

$$v_t = \beta v_{t-1} + (1-\beta)\theta_t \qquad \text{Equation 1:}$$

In Equation 1, $v_t$ can be the exponentially weighted moving average of a given data stream at time t, and $v_{t-1}$ can be the exponentially weighted moving average of the given data stream at t−1. Furthermore, $\theta_t$ can be the data flow rate at time t. Finally, $\beta$ can be a parameter between 0 and 1, inclusive, that is used to moderate how much emphasis (or lack thereof) is placed on the most recent data flow rate term (e.g., $\theta_t$). For example, a relatively larger $\beta$ such as 0.9 or 0.99 may be used to smooth out abrupt changes in data flow rate information that may be temporary or anomalous. Thus, relatively larger $\beta$ terms can be used in situations involving temporarily volatile data streams with insignificant longer-term trends. Conversely, relatively smaller $\beta$ terms such as 0.1 or 0.01 can be used to emphasize changes in the most recent data flow rate term (e.g., $\theta_t$) where the most recent data flow rate can be considered a leading indicator or otherwise predictive of a future trend. Thus, relatively smaller $\beta$ terms can be used in situations with relatively stable (e.g., relatively less volatile) data streams having significant or substantive longer-term trends.

In some embodiments, $\beta$ is further used to define a number of previous data points to consider when calculating the $v_{t-1}$ term. For example, in some embodiments, the $v_{t-1}$ term considers the previous $1/1-\beta$ samples. For example, for $\beta=0.9$, then 10 previous data flow rates can be accounted for in calculating $v_{t-1}$ in Equation 1. The previous data flow rates can refer to measured data flow rates for a respective data stream over the course of a second, a minute, an hour, a day, or a different interval.

Nonetheless, other moving averages are also possible such as, but not limited to, a simple moving average, a cumulative moving average, or a weighted moving average, among others. A simple moving average can be calculated as an unweighted mean for the previous predetermined number of data points. A weighted moving average can apply respective weights to data points at different positions in a set of data points. As one example, a weighted moving average can include decreasing weights for sequentially older data points, thereby placing greater emphasis on newer data relative to older data.

Operation 306 includes determining a respective ingestion frequency for each of the plurality of incoming data streams to the cluster-computing framework. In some embodiments, operation 306 includes determining each respective ingestion frequency by dividing the preferred processing window by the respective moving average data flow rate for each of the plurality of incoming data streams. For example, operation 306 can determine the ingestion frequency according to Equation 2:

$$\text{Ingestion Frequency} = O/v_t \qquad \text{Equation 2:}$$

In Equation 2, O can refer to the preferred processing window and $v_t$ can be the exponentially weighted moving average of a given data stream at time t (e.g., as calculated using Equation 1 or another moving average technique). In some embodiments, the preferred processing window is a range of numbers having a minimum and a maximum, and in various embodiments, O can be considered the midpoint in the range of numbers, the minimum, or the maximum.

Operation 308 includes ingesting each of the incoming data streams to the cluster-computing framework at the respective ingestion frequency determined in operation 306. In some embodiments, the plurality of data streams are staggered so that respective ingestions of data do not occur simultaneously.

As an example, consider a hypothetical source_1 with a moving average data flow rate of 250 MB/hour (e.g., as determined in Equation 1) and a preferred processing window of 1 GB/hour. Then the ingestion frequency (per Equation 2) of 1 GB/hour divided by 250 MB/hour equals once every four hours. Or, said another way, source_1 data is accumulated for four hours and then ingested to, and batch processed by, the cluster-computing framework.

As another example, consider a hypothetical source_2 with a moving average data flow rate of 2 GB/hour (e.g., as determined in Equation 1) and a preferred processing window of 1 GB/hour. Then the ingestion frequency (per Equation 2) of 1 GB/hour divided by 2 GB/hour equals once every half hour (or every 30 minutes). Or, said another way, source_2 data is accumulated for 30 minutes and then ingested to, and batch processed by, the cluster-computing framework.

Operation 310 includes incrementally returning to any of the aforementioned operations in order to update respective ingestion frequencies for processing future data. For example, the method 300 can return to operation 302 to reevaluate the preferred processing window for the cluster-computing framework (e.g., to account for changes to the cluster-computing framework such as the addition or removal of worker nodes). As another example, the method 300 can return to operation 304 and determine an updated respective moving average data flow rate for each of the plurality of incoming data streams (e.g., to account for more or fewer incoming data streams and/or streaming rate changes in each of the incoming data streams).

Operation 312 includes outputting transformed data from the ingested data. The transformed data can have a predetermined format or a standardized format so that it is usable for big data processing operations.

Operation 314 includes generating insights from the transformed data. In some embodiments, operation 314 includes performing big data processing on the transformed data in order to generate insights. In some embodiments, operation 314 utilizes the transformed data as training data for machine learning algorithms, deep learning algorithms, and/or other artificial intelligence applications. Operation 314 can include, for example, inputting the transformed data into a machine learning model and outputting a result such as one or more reports, visualizations, or other outputs. In some embodiments, operation 314 can include training a machine learning model on the transformed data and outputting a trained machine learning model in response to the training.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques. Any of the transformed data output in operation 312 can be analyzed or utilized as training data using any of the aforementioned machine learning algorithms.

More specifically, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Figure 4:
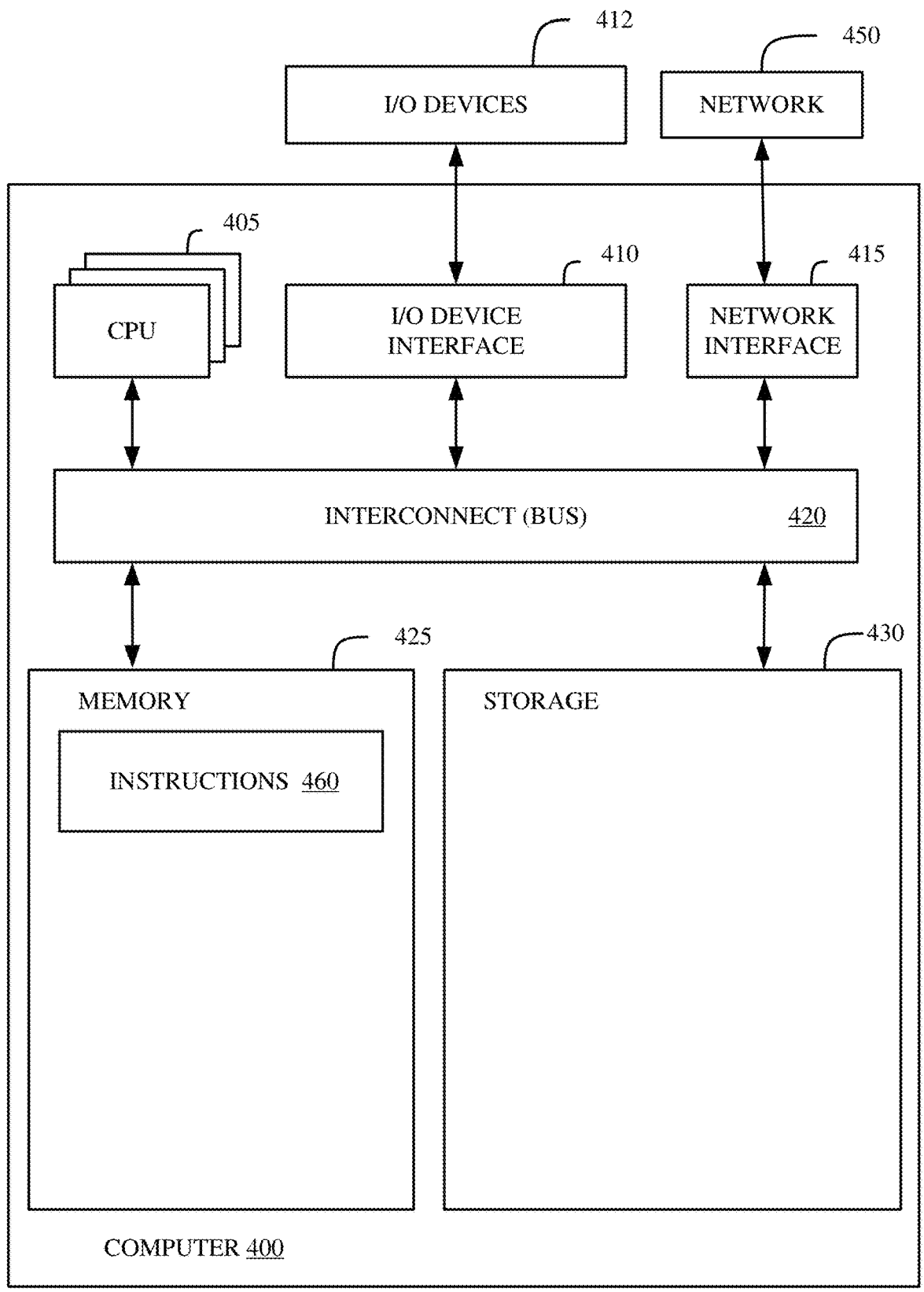
FIG. 4 illustrates a block diagram of an example computer, in accordance with some embodiments of the present disclosure.

FIG. 4 illustrates a block diagram of an example computer 400 in accordance with some embodiments of the present disclosure. In various embodiments, computer 400 can perform any or all of the method described in FIG. 3 and/or implement the functionality discussed in any one of FIGS. 1A, 1B, and/or 2. In some embodiments, computer 400 receives instructions related to the aforementioned methods and functionalities by downloading processor-executable instructions from a remote data processing system via network 450. In other embodiments, computer 400 provides instructions for the aforementioned methods and/or functionalities to a client machine such that the client machine executes the method, or a portion of the method, based on the instructions provided by computer 400. In some embodiments, the computer 400 is incorporated into (or functionality similar to computer 400 is virtually provisioned to) the cluster-computing framework 114, master node 202, or another aspect of the present disclosure.

Computer 400 includes memory 425, storage 430, interconnect 420 (e.g., BUS), one or more CPUs 405 (also referred to as processors herein), I/O device interface 410, I/O devices 412, and network interface 415.

Each CPU 405 retrieves and executes programming instructions stored in memory 425 or storage 430. Interconnect 420 is used to move data, such as programming instructions, between the CPUs 405, I/O device interface 410, storage 430, network interface 415, and memory 425.

Interconnect 420 can be implemented using one or more busses. CPUs 405 can be a single CPU, multiple CPUs, or a single CPU having multiple processing cores in various embodiments. In some embodiments, CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random-access memory (e.g., static random-access memory (SRAM), dynamic random access memory (DRAM), or Flash). Storage 430 is generally included to be representative of a non-volatile memory, such as a hard disk drive, solid state device (SSD), removable memory cards, optical storage, or flash memory devices. In an alternative embodiment, storage 430 can be replaced by storage area-network (SAN) devices, the cloud, or other devices connected to computer 400 via I/O device interface 410 or network 450 via network interface 415.

In some embodiments, memory 425 stores instructions 460. However, in various embodiments, instructions 460 are stored partially in memory 425 and partially in storage 430, or they are stored entirely in memory 425 or entirely in storage 430, or they are accessed over network 450 via network interface 415.

Instructions 460 can be computer-readable and computer-executable instructions for performing any portion of, or all of, the method of FIG. 3 and/or implement the functionality discussed in FIGS. 1A, 1B, and/or 2. In some embodiments, instructions 460 can be referred to as a data ingestion protocol, a data ingestion mechanism, or data ingestion instructions. Although instructions 460 are shown in memory 425, instructions 460 can include program instructions collectively stored across numerous computer-readable storage media and executable by one or more CPUs 405.

In various embodiments, I/O devices 412 include an interface capable of presenting information and receiving input. For example, I/O devices 412 can present information to a user interacting with computer 400 and receive input from the user.

Computer 400 is connected to network 450 via network interface 415. Network 450 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
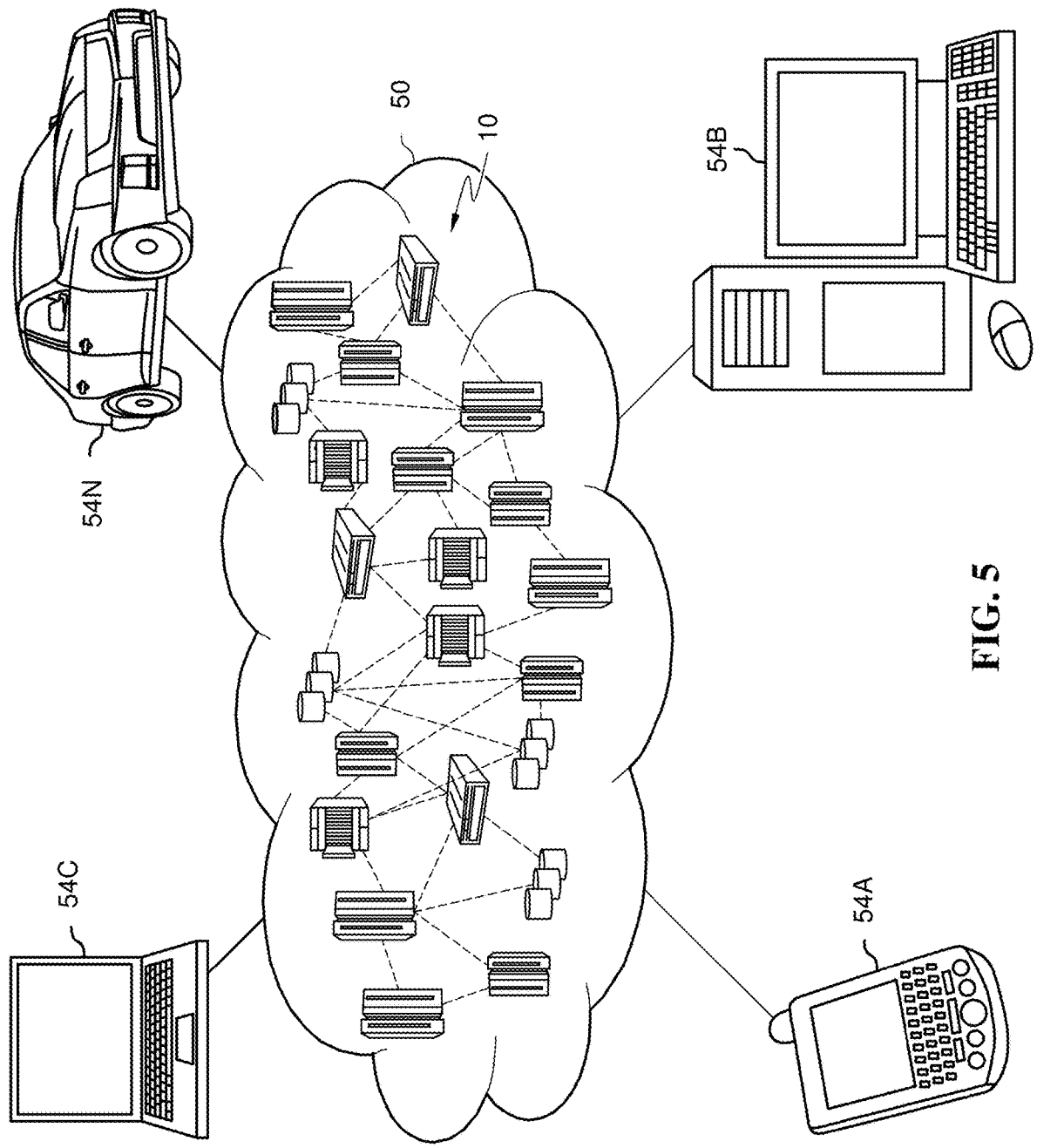
FIG. 5 depicts a cloud computing environment, in accordance with some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
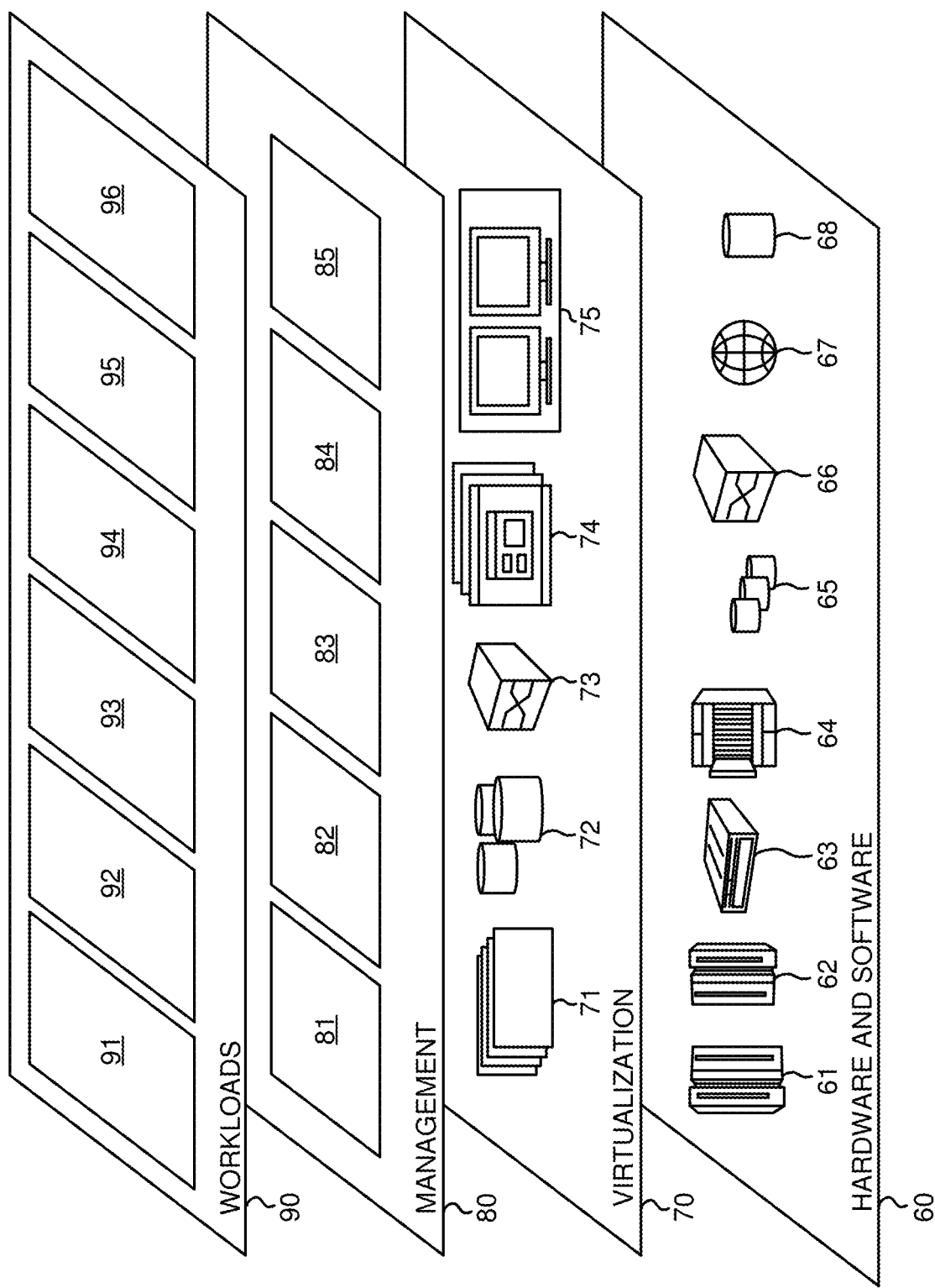
FIG. 6 depicts abstraction model layers, in accordance with some embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and adaptive data ingestion management 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 460 of FIG. 4 and/or any software configured to perform any portion of the method described with respect to FIG. 3 and/or implement any portion of the functionality discussed in FIGS. 1A, 1B, and/or 2) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method comprising:
   determining a respective moving average streaming rate for each of a plurality of incoming data streams to a cluster-computing framework, wherein the cluster-computing framework includes a plurality of worker nodes;
   determining a respective ingestion frequency for each of the plurality of incoming data streams by dividing a platform-preferred ingestion rate of the cluster-computing framework by a respective moving average streaming rate of each of the plurality of incoming data streams; and
   adjusting ingestion frequencies of the plurality of worker nodes to the determined ingestion frequencies.

2. The method of claim 1, wherein the cluster-computing framework is configured to transform the plurality of incoming data streams into a first format.

3. The method of claim 1, comprising:
   outputting, in response to the worker nodes ingesting the incoming data streams at the adjusted ingestion frequencies, transformed data corresponding to the plurality of incoming data streams, wherein the transformed data is in a first format.

4. The method of claim 3, comprising:
   performing machine learning on the transformed data; and
   outputting a result based on performing the machine learning on the transformed data.

5. The method of claim 3, comprising: training a machine learning model using the transformed data.

6. The method of claim 1, wherein the platform-preferred ingestion rate of the cluster-computing framework is based on characteristics of the worker nodes.

7. The method of claim 6, wherein the characteristics include an amount of read-access memory (RAM) on the worker nodes.

8. The method of claim 1, wherein the moving average streaming rates of the incoming data streams are weighted moving averages.

9. The method of claim 1, wherein the moving average streaming rates of the incoming data streams are exponentially weighted moving averages.

10. The method of claim 1, wherein the method is performed according to software that is downloaded to the cluster-computing framework from a remote data processing system, and comprising:
    metering a usage of the software; and
    generating an invoice based on metering the usage.

11. A system comprising:
    a processor; and
    logic integrated with the processor, executable by the processor, or integrated with and executable by the processor, the logic being configured to:
    determine a respective moving average streaming rate for each of a plurality of incoming data streams to a cluster-computing framework,
    wherein the cluster-computing framework includes a plurality of worker nodes;
    determine a respective ingestion frequency for each of the plurality of incoming data streams by dividing a platform-preferred ingestion rate of the cluster-computing framework by a moving average streaming rate of each of the plurality of incoming data streams; and
    adjust ingestion frequencies of the plurality of worker nodes to the determined ingestion frequencies.

12. The system of claim 11, the logic being configured to:
    output, in response to the worker nodes ingesting the incoming data streams at the adjusted ingestion frequencies, transformed data corresponding to the plurality of incoming data streams, wherein the transformed data is in a first format.

13. The system of claim 11, wherein the platform-preferred ingestion rate of the cluster-computing framework is based on a number of worker nodes associated with the cluster-computing framework, a number of processing cores associated with the cluster-computing framework, and an amount of read-access memory (RAM) associated with the cluster-computing framework.

14. The system of claim 11, wherein the moving average streaming rates of the incoming data streams are weighted moving averages.

15. The system of claim 11, wherein the moving average streaming rates of the incoming data streams are exponentially weighted moving averages.

16. A computer program product, the computer program product comprising a computer readable storage medium having program instructions embodied therewith, the program instructions readable and/or executable by a processor to cause the processor to:

determine, by the processor, a respective moving average streaming rate for each of a plurality of incoming data streams to a cluster-computing framework, wherein the cluster-computing framework includes a plurality of worker nodes;

determine, by the processor, a respective ingestion frequency incoming data streams by dividing a platform-preferred ingestion rate of the cluster-computing framework by a respective moving average streaming rate of each of the plurality of incoming data streams; and adjust, by the processor, ingestion frequencies of the plurality of worker nodes to the determined ingestion frequencies.

17. The computer program product of claim 16, the program instructions readable and/or executable by the processor to cause the processor to:

output, by the processor, in response to the worker nodes ingesting the incoming data streams at the adjusted ingestion frequencies, transformed data corresponding to the plurality of incoming data streams, wherein the transformed data is in a first format.

18. The computer program product of claim 16, wherein the platform-preferred ingestion rate of the cluster-computing framework is based on a number of worker nodes associated with the cluster-computing framework, a number of processing cores associated with the cluster-computing framework, and an amount of read-access memory (RAM) associated with the cluster-computing framework.

19. The computer program product of claim 16, wherein the moving average streaming rates of the incoming data streams are weighted moving averages.

20. The computer program product of claim 16, wherein the moving average streaming rates of the incoming data streams are exponentially weighted moving averages.

\* \* \* \* \*